United States Patent
Park et al.

(10) Patent No.: US 8,660,529 B2
(45) Date of Patent: Feb. 25, 2014

(54) MOBILE TERMINAL FOR PREVENTING ILLEGITIMATE CHANGE OF IDENTIFICATION NUMBER BY MATCHING AUTHENTICATION INFORMATION

(75) Inventors: Gun Woo Park, Gumi-si (KR); Pyoung Ju Hwang, Gumi-si (KR); Kwan Min Shin, Seoul (KR); Byoung Suk Yea, Gumi-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1629 days.

(21) Appl. No.: 11/906,932

(22) Filed: Oct. 4, 2007

(65) Prior Publication Data

US 2008/0207169 A1 Aug. 28, 2008

(30) Foreign Application Priority Data

Feb. 28, 2007 (KR) .................. 10-2007-0020211

(51) Int. Cl.
*H04M 3/16* (2006.01)
(52) U.S. Cl.
USPC .............. 455/411; 455/410; 726/3; 713/176
(58) Field of Classification Search
USPC ............... 455/410, 411; 379/189; 726/1–36
See application file for complete search history.

(56) References Cited

U.S. PATENT DOCUMENTS

| 4,424,573 | A | 1/1984 | Eckert, Jr. et al. ............ 364/900 |
| 4,690,475 | A | 9/1987 | McElroy ....................... 439/502 |
| 4,694,408 | A | 9/1987 | Zaleski ......................... 364/551 |
| 4,783,745 | A | 11/1988 | Brookner et al. ......... 364/464.02 |
| 4,831,560 | A | 5/1989 | Zaleski ..................... 364/551.01 |
| 5,864,664 | A | 1/1999 | Capps, Jr. et al. ............. 395/186 |
| 5,935,180 | A | 8/1999 | Fieramosca et al. ............. 701/29 |
| 5,950,149 | A | 9/1999 | Fieramosca et al. .......... 702/183 |
| 6,021,366 | A | 2/2000 | Fieramosca et al. ............ 701/33 |
| 6,223,290 | B1 * | 4/2001 | Larsen et al. ..................... 726/3 |
| 6,856,844 | B1 | 2/2005 | McKenzie ....................... 700/96 |

(Continued)

FOREIGN PATENT DOCUMENTS

| EP | 1 571 859 A2 | 9/2005 | .............. H04Q 7/32 |
| KR | 2001-43378 | 5/2001 | .............. H04Q 7/38 |

(Continued)

OTHER PUBLICATIONS

Aerrabotu, Naveen, et al.; Patent Application Publication No: US 2004/0192281 Al; Publication No. Sep. 30, 2004; "Method and Apparatus for Updating a Subscriber . . .;".

*Primary Examiner* — Dwayne Bost
*Assistant Examiner* — Gerald Johnson
(74) *Attorney, Agent, or Firm* — Cha & Reiter, LLC

(57) ABSTRACT

The present invention relates to a mobile terminal and a method for preventing illegitimate change of an identification number of the mobile terminal. The method includes receiving, if change of an identification number is requested, and storing new authentication information and encoding the authentication information; determining whether a previously stored first authentication information exists; storing, if a previously stored first authentication information does not exist, an identification number, and storing the encoded authentication information as a first authentication information; and determining, if a previously stored first authentication information exists, whether the encoded authentication information corresponds to the first authentication information, and storing an identification number, if the encoded authentication information corresponds to the first authentication information, and performing error handling, if the encoded authentication information does not correspond to the first authentication information.

11 Claims, 3 Drawing Sheets

(56) References Cited

U.S. PATENT DOCUMENTS

| | | | |
|---|---|---|---|
| 6,978,198 B2 | 12/2005 | Shi | 701/33 |
| 7,610,039 B2 * | 10/2009 | Kim | 455/410 |
| 7,783,281 B1 * | 8/2010 | Cook et al. | 455/410 |
| 2003/0061488 A1 * | 3/2003 | Huebler et al. | 713/176 |

FOREIGN PATENT DOCUMENTS

| | | | |
|---|---|---|---|
| KR | 2006-24676 | 3/2006 | H04B 1/40 |
| WO | WO 98/56201 | 12/1998 | H04Q 7/32 |
| WO | WO 01/76309 | 10/2001 | H04Q 7/38 |

* cited by examiner

MOBILE TERMINAL FOR PREVENTING ILLEGITIMATE CHANGE OF IDENTIFICATION NUMBER BY MATCHING AUTHENTICATION INFORMATION

CLAIMS OF PRIORITY

This application claims priority to an application entitled "MOBILE TERMINAL AND METHOD FOR PREVENTING ILLEGITIMATE CHANGE OF IDENTIFICATION NUMBER OF THE SAME" filed in the Korean Intellectual Property Office on Feb. 28, 2007 and assigned Serial No. 2007-0020211, the entire contents of which are incorporated herein by reference.

FIELD OF THE INVENTION

The present invention relates to a mobile terminal and a method for preventing illegitimate change of an identification number of the mobile terminal. In particular, the present invention relates to a mobile terminal and a method for preventing illegitimate change of an identification number of the mobile terminal by encoding authentication information.

DESCRIPTION OF THE RELATED ART

Every mobile terminal has a unique identification number allocated for differentiation. The identification number is referred to as an ESN (Electronic Serial Number) in CDMA (Code Division Multiple Access) phones, or an IMEI (International Mobile Equipment Identity) in GSM (Global System for Mobile communication) phones.

With recent functional trends, the mobile terminal includes a multimedia function, for example a camera, an electronic diary or a game as well as a mobile communication function. As functionality of mobile terminals increases, mobile terminals are frequently stolen. An ill-intentioned user may change an identification number of the stolen mobile terminal and re-sell the mobile terminal.

A conventional method for preventing illegitimate change of an identification number has been suggested that stores the identification number in a one time programmable (OTP) area of a memory unit, where an identification number can only be stored once in a mobile terminal manufacturing step, thereby preventing change of the identification number that may occur thereafter. However, the conventional method can not be used to make legitimate change of the identification number.

In order to solve the problem, a normal memory having an identification number stored therein may be replaced; however this solution has disadvantages of generating additional costs and wasting resources.

SUMMARY OF THE INVENTION

The present invention provides a mobile terminal and method for preventing illegitimate change of an identification number of the mobile terminal in the case that an attempt to illegitimately change the identification number is made.

The present invention further provides a mobile terminal and method for legitimately changing an identification number of a mobile terminal in the case that an attempt to legitimately change the identification number is made.

According to an embodiment of the present invention, a method for preventing illegitimate change of an identification number of a mobile terminal not having authentication information and a code includes: receiving new authentication information; if change of an identification number is requested, encoding and storing the received new authentication information; determining whether a previously stored first authentication information exists; if a previously stored first authentication information does not exist, storing an identification number and the encoded authentication information as a first authentication information; if a previously stored first authentication information exists, performing the steps of:

determining whether the encoded authentication information corresponds to the first authentication information;

if the encoded authentication information corresponds to the first authentication information, storing an identification number, and if the encoded authentication information does not correspond to the first authentication information, performing error handling.

According to another embodiment of the present invention, a mobile terminal includes: a storage unit for storage of authentication information, a code, an identification number and a first authentication information; an encoding unit for encoding of the stored authentication information to generate an encoded authentication information; a comparing unit for comparison of the encoded authentication information with the first authentication information; and a control unit for storage of, if the encoded authentication information corresponds to the first authentication information, the identification number, and for performance of, if the encoded authentication information does not correspond to the first authentication information, error handling.

BRIEF DESCRIPTION OF THE DRAWINGS

The features and advantages of the present invention will become more apparent from the following detailed description in conjunction with the accompanying drawings, in which.

DETAILED DESCRIPTION OF THE INVENTION

Figure 1:
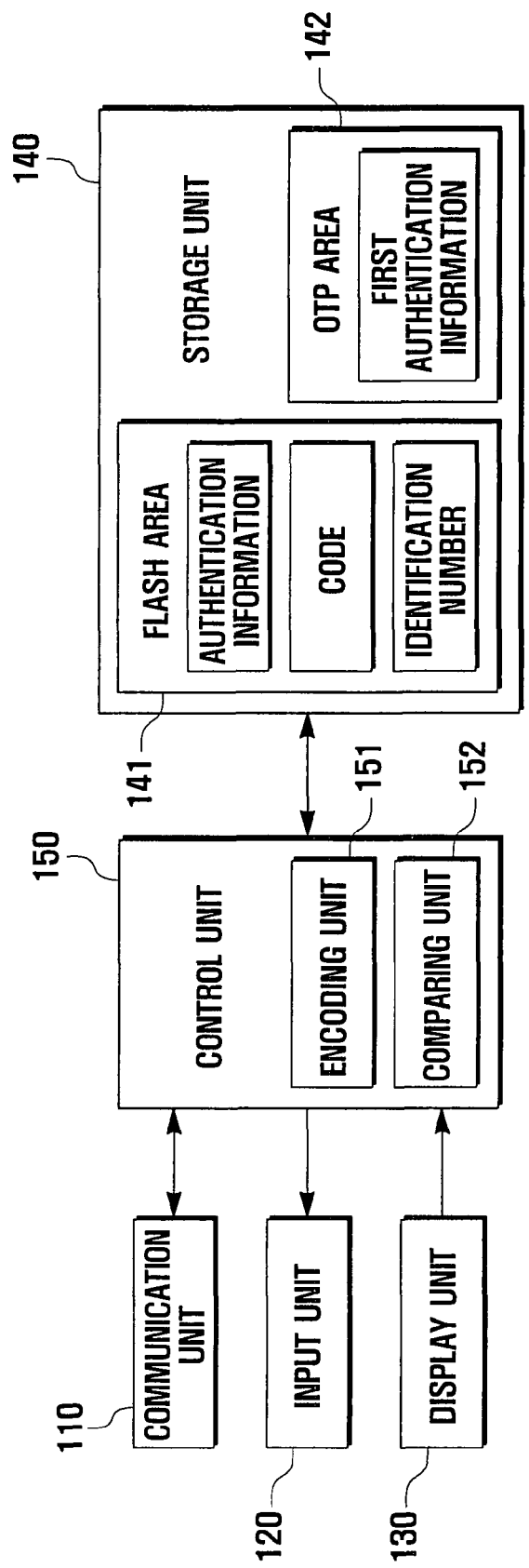
FIG. 1 is a schematic block diagram of a configuration of a mobile terminal according to an embodiment of the present invention.

Embodiments of the present invention are described hereinbelow with reference to the accompanying drawings in detail. The same reference numbers are used throughout the drawings to refer to the same or like parts. For the purposes of clarity and simplicity, detailed description of well-known functions and structures incorporated herein may be omitted to avoid obscuring the subject matter of the present invention.

The present invention relates to a mobile terminal and a method for preventing illegitimate change of an identification number of the mobile terminal, and in particular, to a mobile terminal and method for preventing illegitimate change of an identification number of the mobile terminal using an encoding algorithm and authentication information stored in a one time programmable (OTP) area incapable of changing and erasing data.

The mobile terminal of the present invention is a terminal capable of personal portability and wireless communication, for example a mobile communication terminal, mobile phone, PDA (Personal Digital Assistant), smart phone, DMB (Digital Multimedia Broadcasting) phone or wireless LAN terminal.

The identification number of the present invention is a unique identification number allocated to each mobile terminal for differentiation. The identification number is referred to as an ESN (Electronic Serial Number) in CDMA (Code Division Multiple Access) phones, or an IMEI (International Mobile Equipment Identity) in GSM (Global System for Mobile communication) phones.

In a typical mobile communication system, when a user subscribes to a mobile communication service, an identification number is matched with a telephone number of a mobile communication terminal and stored in a database of a corresponding mobile switching center.

An 'authentication data server' of the present invention stores authentication information and a code in a database type in which the authentication information (for example, a Master Subsidy Lock Address) is matched with the code (for example, a Master Subsidy Lock Code).

An 'identification number server' of the present invention stores an identification number, and, upon receiving an identification number transmission request signal from the mobile terminal, transmits the identification number to the mobile terminal.

A 'first authentication information' is formed by encoding the authentication information received from the authentication data server in a mobile terminal manufacturing process, and is stored in an OTP area of the mobile terminal.

The 'OTP' area is a memory device incapable of changing or erasing data stored once, and as a result, a person attempting to illegitimately change the identification number of the mobile terminal (hereinafter a "hacker") cannot erase the stored first authentication information and store new first authentication information, and cannot change the first authentication information, and thereby the identification number is prevented from hacking.

According to the present invention, for the case that there is need to legitimately change an identification number stored in a storage unit, the mobile terminal encodes the identification number stored in the storage unit to generate an encoded authentication information.

Next, the mobile terminal determines whether the generated encoded authentication information corresponds to the first authentication information stored in the OTP area.

As a result of the determination, in the case that the encoded authentication information corresponds to the first authentication information, the mobile terminal stores an identification number in the storage unit, and in the case that the encoded authentication information does not correspond to the first authentication information, the mobile terminal performs error handling.

The error handling is performed to inform a mobile terminal user that an attempt to change the identification number is unauthorized, and this error handling may be performed by interrupting a power supply to the mobile terminal or by outputting a message to notify that change of the identification number is not possible.

In the present invention, in the case that a hacker attempts to illegitimately change the identification number stored in the mobile terminal, the hacker may erase the authentication information, code and identification number stored in the storage unit in an attempt to make a state of the mobile terminal equivalent to an initial state of the mobile terminal manufacturing process. However, the first authentication information is stored in the OTP area, and thus it is impossible to change or erase the first authentication information by hacking. The hacker generates an arbitrary authentication information and code using a hacking program, and stores the generated arbitrary authentication information and code in the storage unit. The hacker then encodes the arbitrary authentication information stored in the storage unit to generate an encoded authentication information, and compares the encoded authentication information with the first authentication information stored in the OTP area.

However, the encoded authentication information and the first authentication information are formed by encoding different authentication information, and thus the encoded authentication information does not correspond to the first authentication information. Therefore, it is impossible to change the identification number by hacking.

Hereinafter, embodiments of the present invention are described with reference to the accompanying drawings in detail. FIG. 1 is a schematic block diagram of a configuration of a mobile terminal according to an exemplary embodiment of the present invention. Referring to FIG. 1, the mobile terminal includes a communication unit 110, an input unit 120, a display unit 130, a storage unit 140 and a control unit 150.

The communication unit 110 includes an RF (Radio Frequency) transmitting unit for up-converting and amplifying the frequency of a signal to be transmitted, and a RF receiving device for low noise amplifying a received signal and down-converting the frequency of the received signal. The communication unit 110 transmits and receives data using a wireless network. The input unit 120 may include a touch pad or a keypad having various function keys, numeric keys, hot keys and character keys, and outputs a signal input by a user to the control unit 150 for controlling the operation of the mobile terminal. The display unit 130 may include an LCD (Liquid Crystal Display), and displays various display data and a current operational state of the mobile terminal. The storage unit 140 stores programs and data required for the whole operation of the mobile terminal according to an exemplary embodiment of the present invention. In particular, the storage unit 140 of the present invention has a flash area 141 for storing authentication information and a code received from an authentication data server and an identification number received from a identification number server. The flash area 141 is characterized in that data stored once is not erased, but retained even in the case of power off. In the case that there is need to change or erase data stored in the flash area 141, the flash area 141 changes or erases the data by the control of the control unit 150. For this purpose, it is preferable to use a non-volatile flash memory as the flash area 141. The storage unit 140 has an OTP area 142 for storing a first authentication information formed by encoding the authentication information received from the authentication data server in a mobile terminal manufacturing process. The OTP area 142 is a memory device that is incapable of changing or erasing stored data, and in the case that there is need to change data stored in the OTP area 142, the OTP area 142 should be replaced with a new configuration to store new data. The control unit 150 controls the whole operation of the mobile terminal.

According to the present invention, when the mobile terminal is connected to the authentication data server, the control unit 150 receives an authentication information transmission request signal from the authentication data server, and then determines whether authentication information and a code are stored in the storage unit 140. In the case that authentication information and a code do not exist (equivalent to an initial state of the mobile terminal manufacturing process); the control unit 150 transmits a signal (for example, '0xFFFFFFFF') to the authentication data server informing that the storage unit 140 does not currently store authentication information and a code. The control unit 150 then receives authentication information and a code from the authentication data server, and stores the authentication information and code in the storage unit 140. In the case that authentication information and a code exist, the control unit 150 transmits the authentication information stored in the storage unit 140 to the authentication data server. The control unit 150 then receives a code corresponding to the transmitted authentication information from the authentication data server, and determines whether the code stored in the storage unit 140 corresponds to the received code. If the two codes correspond to each other, the control unit 150 encodes the authentication information stored in the storage unit 140 to generate an encoded authentication information, and if the two codes do not correspond to each other, the control unit 150 performs error handling. The control unit 150 preferably includes an encoding unit 151 for encoding the authentication information stored in the storage unit 140 to generate an encoded authentication information. The control unit 150 compares the generated encoded authentication information with the first authentication information stored in the OTP area 142 to determine whether they correspond to each other. For this purpose, the control unit 150 preferably includes a comparing unit 152 for comparing the generated encoded authentication information with the first authentication information stored in the OTP area 142. After comparison in the comparing unit 152, in the case that the information corresponds to each other, the control unit 150 transmits an identification number request signal to the identification number server. The control unit 150 then receives an identification number from the identification number server, and stores the identification number in the storage unit 140. After comparison in the comparing unit 152, in the case that the information does not correspond to each other, the control unit 150 performs error handling.

Figure 2:
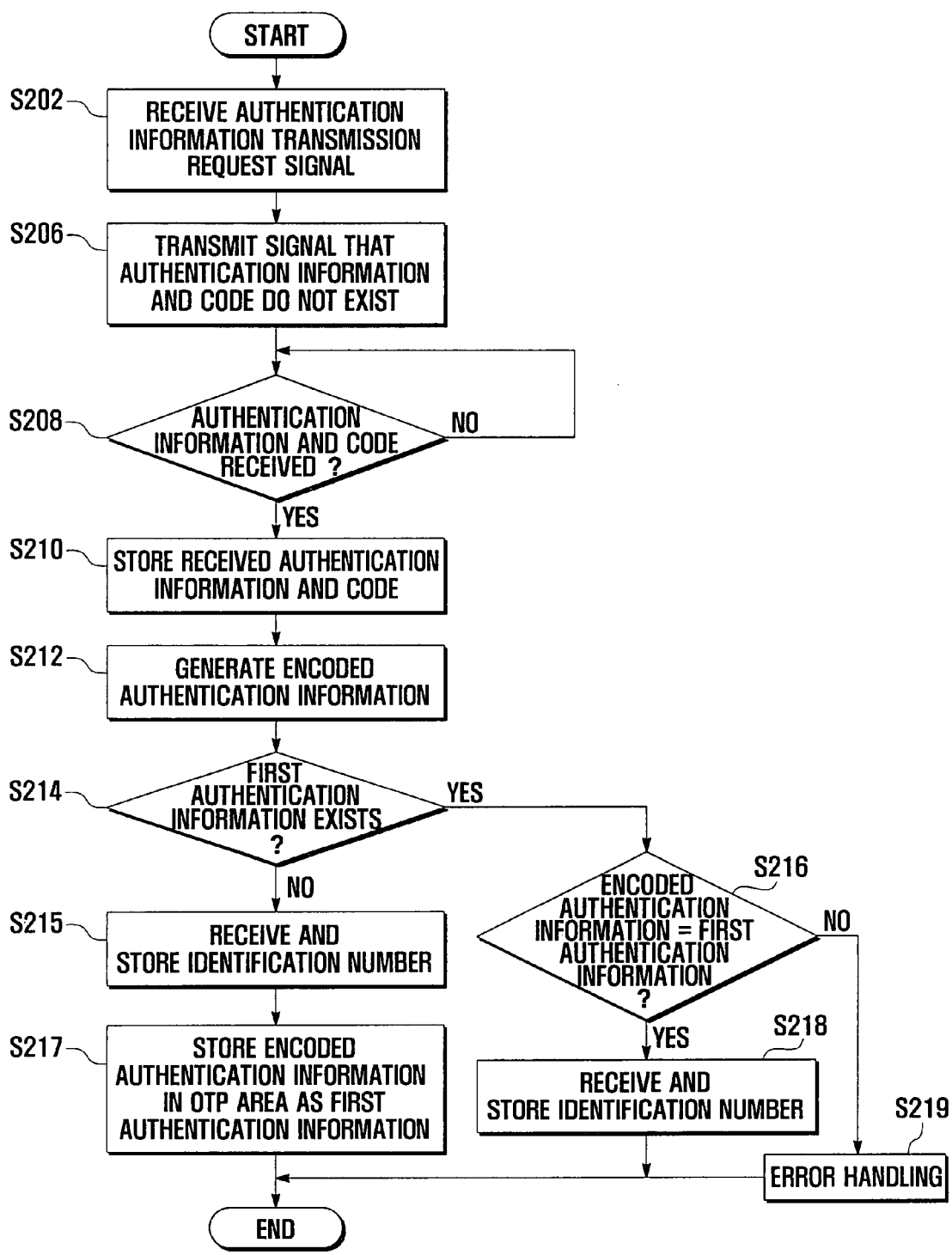
FIG. 2 is a flow chart illustrating a method for preventing illegitimate change of an identification number of a mobile terminal not having authentication information and a code according to an embodiment of the present invention.

FIG. 2 is a flow chart illustrating a method for preventing illegitimate change of an identification number of a mobile terminal not having authentication information and a code according to an exemplary embodiment of the present invention.

Referring to FIGS. 1 and 2, when the mobile terminal is connected to the authentication data server, the mobile terminal receives an authentication information transmission request signal from the authentication data server (S202). The control unit 150 of the mobile terminal determines whether authentication information and a code exist in the storage unit 140. In the present exemplary embodiment, the mobile terminal is currently in a state wherein a hacker has erased authentication information, a code and an identification number for hacking purposes, or wherein authentication information, a code and an identification number have not been stored in a mobile terminal manufacturing process. Thus, the mobile terminal determines that authentication information and a code stored in the storage unit 140 do not exit. The storage unit 140 does not have authentication information and a code stored therein, and thus the control unit 150 transmits a signal (for example, '0xFFFFFFFF') to the authentication data server informing that authentication information and a code stored in the storage unit 140 do not exist currently, (S206). The control unit 150 determines whether new authentication information (for example, '12345qwert') and a code (for example '12qwas') are received from the authentication data server (S208). If new authentication information and code are not received, the control unit 150 waits until the authentication information and code are received. When new authentication information and code are received at step S208, the control unit 150 stores the received authentication information and code in the storage unit 140 (S210). Next, the control unit 150 encodes the authentication information stored in the storage unit 140 to generate an encoded authentication information (for example, '1q2w3easw234to6pylhg') (S212). The authentication information may be encoded by various methods, however the present embodiment describes a method, in which the length of data is extended and hashed to prevent interpretation of the encoded authentication information when hacking. For example, assuming that the data length of authentication information (for example, '12345qwert') is 10 bytes, the mobile terminal hashes the data length of the authentication information to 20 bytes using a hashing function (for example, SHA1). The encoded authentication information (for example, '1q2w3easw234to6pylhg') is formed by encoding the authentication information stored in the storage unit 140 of the mobile terminal, and is compared with a first authentication information that is initially stored in the OTP area 142 in the mobile terminal manufacturing process. After the encoded authentication information is generated at step S212, the control unit 150 determines whether an encoded authentication information stored in the mobile terminal manufacturing process, i.e. the first authentication information, exists in the OTP area 142 (S214). According to the present invention, if the first authentication information does not exist, the control unit 150 recognizes that the mobile terminal is in a manufacturing process, and if the first authentication information exists, the control unit 150 recognizes that the mobile terminal is in a hacking process. Specifically, if the control unit 150 determines that first authentication information does not exist at step S214, the control unit 150 determines that a mobile terminal manufacturing process in performed. Thus, the control unit 150 transmits an identification number transmission request signal to the identification number server for storing an identification number. When the control unit 150 receives the identification number, the control unit 150 stores the received identification number in the storage unit 140 (S215). The control unit 150 then stores the encoded authentication information generated at step S212 in the OTP area 142 to generate a first authentication information (S217). If the control unit 150 determines that the first authentication information exists at step S214, the control unit 150 next determines whether the encoded authentication information generated at step S212 corresponds to the first authentication information (S216). If the encoded authentication information does not correspond to the first authentication information, the control unit 150 recognizes that a hacking attempt is performed, and performs error handling (S219). If the encoded authentication information corresponds to the first authentication information, the control unit 150 transmits an identification number transmission request signal to the identification number server for storing an identification number. When the control unit 150 receives the identification number, the control unit 150 stores the received identification number in the storage unit 140 (S218).

Figure 3:
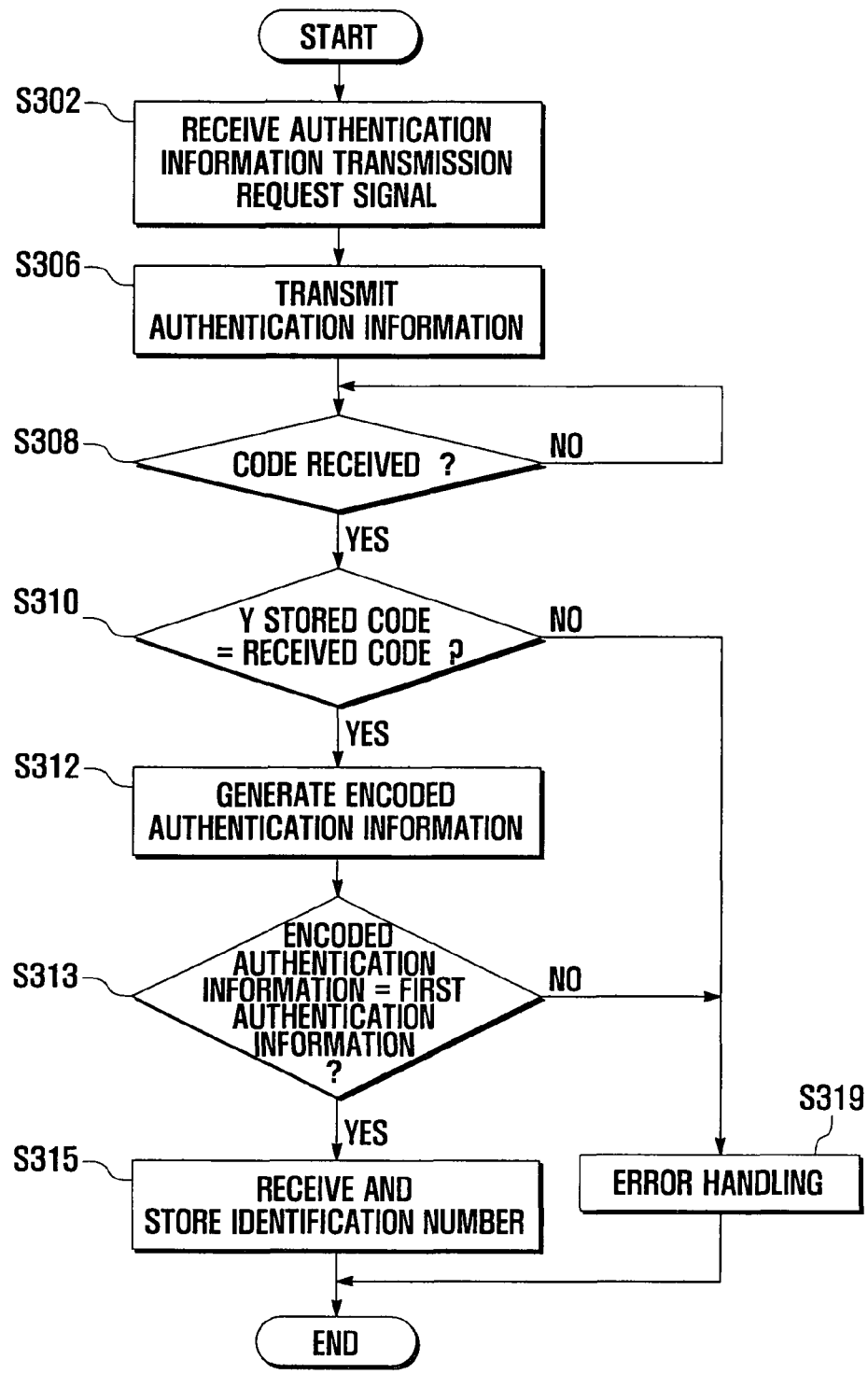
FIG. 3 is a flow chart illustrating a method for preventing illegitimate change of an identification number of a mobile terminal having authentication information and a code according to an embodiment of the present invention.

FIG. 3 is a flow chart illustrating a method for preventing illegitimate change of an identification number of a mobile terminal having authentication information and a code according to an exemplary embodiment of the present invention. Referring to FIGS. 1 and 3, when the mobile terminal is connected to the authentication data server, the mobile terminal receives an authentication information transmission request signal from the authentication data server (S302). The control unit 150 determines whether authentication information and a code exist in the storage unit 140. In the present exemplary embodiment, authentication information and a code exist in the storage unit 140, and thus the control unit 150 transmits the stored authentication information (for example, '12345qwert') to the authentication data server (S306). Next, the control unit 150 determines whether a code (for example, '12qwas') is received from the authentication data server (S308). The code corresponds to the authentication information transmitted from the mobile terminal at step S306. When the control unit 150 receives a code from the authentication data server, the control unit 150 determines whether the code stored in the storage unit 140 corresponds to the received code (S310). If the authentication information and code presently stored in the storage unit 140 have been received from the authentication data server, as a result of comparison, the code stored in the storage unit 140 corresponds to the received code in a code comparing result. If the authentication information and code stored in the storage unit 140 have been generated by a hacking program, as a result of comparison, the code stored in the storage unit 140 does not correspond to the received code. If the code stored in the storage unit 140 does not correspond to the received code at step S310, the control unit 150 recognizes that a hacking attempt is performed, and performs error handling (S319). If the code stored in the storage unit 140 corresponds to the received code at step S310, the control unit 150 encodes the authentication information stored in the storage unit 140 to generate an encoded authentication information (S312). Next, the control unit 150 determines whether the encoded authentication information generated at step S312 corresponds to a first authentication information (for example, '1q2w3easw234to6pylhg') stored in the OTP area 142 (S314). If the encoded authentication information does not correspond to a first authentication information, the control unit 150 recognizes that a hacking attempt is performed, and performs error handling (S319). If the encoded authentication information corresponds to a first authentication information at step S314, the control unit 150 transmits an identification number transmission request signal to the identification number server for storing an identification number. When the control unit 150 receives the identification number, the control unit 150 stores the received identification number in the storage unit 140 (S315).

As described above, in the case that an unauthorized user attempts to change an identification number, the present invention prevents illegitimate change of the identification number. In the case that an authorized user attempts to change an identification number, the present invention enables the user to change the identification number.

Although embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method for preventing illegitimate change of an identification number of a mobile terminal not having authentication information and a code, the method comprising:
   if change of an identification number is requested, receiving and storing new authentication information and encoding the new authentication information;
   determining whether a previously-stored first authentication information exists;
   if a previously-stored first authentication information does not exist, storing an identification number and the newly encoded authentication information as a first authentication information; and
   if a previously-stored first authentication information including a previously-stored identification number exists, performing the steps of
      determining whether the encoded authentication information corresponds to the first authentication information,
      if the encoded authentication information corresponds to the first authentication information, storing new identification number that replaces the previously stored identification number, and
      if the encoded authentication information does not correspond to the first authentication information, performing error handling;
         wherein the first authentication information is a number other than one or both of an equipment serial number (ESN) or an international mobile equipment identifier (IMEI) and is formed by encoding authentication information received from an authentication data server and is stored in a one-time programmable (OTP) area in the mobile terminal in which information stored once cannot be permanently changed or erased; and wherein both the previously-stored identification number and the new identification that replaces that previously stored identification number is stored in an area of a memory of the mobile terminal other than the OTP area.

2. The method of claim 1, wherein the authentication data server
   stores authentication data formed by matching authentication information with a code.

3. The method of claim 1, wherein the identification number is a unique identification number allocated to each mobile terminal for differentiation.

4. The method of claim 1, wherein the step of performing error handling comprises one of the steps selected from the group consisting of interrupting power supply to the mobile terminal and outputting a message to notify that change of the identification number is not possible.

5. The method of claim 1, wherein the step of receiving and storing authentication information comprises:
   connecting to the authentication data server and receiving an authentication information transmission request signal from the authentication data server;
   transmitting a signal to the authentication data server notifying that authentication information is not stored; and
   receiving and storing new authentication information from the authentication data server.

6. The method of claim 1, wherein the step of receiving and storing authentication information from the authentication data server further comprises receiving and storing a code corresponding to the authentication information from the authentication data server.

7. A method for preventing illegitimate change of an identification number of a mobile terminal having stored an authentication information, a code and a first authentication information, the method comprising:
   if change of an identification number is requested, encoding the stored authentication information;
   determining whether the encoded authentication information corresponds to the stored first authentication information;

if the encoded authentication information corresponds to the first authentication information, storing an identification number; and if the encoded authentication information does not correspond to the first authentication information, performing error handling;

wherein the first authentication information is a number other than one or both of an equipment serial number (ESN) or an international mobile equipment identifier (IMEI) and is formed by encoding authentication information received from the authentication data server and is stored in a one-time programmable (OTP) area in which information stored once cannot be permanently changed and erased; and wherein the identification number comprises one or both of the ESN and the IMEI and is stored in an area of a memory in the mobile terminal other than the OTP area that can be erased in order to change the identification number after comparing the first authentication number in the OTP with the encoded authentication information.

8. The method of claim 7, wherein the step of encoding the authentication information further comprises the steps of:

transmitting the stored authentication information to an authentication data server and receiving a code corresponding to the transmitted authentication information;

determining whether the received code corresponds to the stored code;

if the received code corresponds to the stored code, encoding the stored authentication information; and if the received code does not correspond to the stored code, performing error handling to accomplish one action selected from the group consisting of interrupt power supply to the mobile terminal and output a message to notify that change of the identification number is not possible.

9. The method of claim 7, wherein the identification number is a unique identification number allocated to each mobile terminal for differentiation.

10. A mobile terminal comprising:

a storage unit for storage of an authentication information, a code, an identification number and a first authentication information in which said first authentication number is a number other than one or both of an equipment serial number (ESN) or an international mobile equipment identifier (IMEI);

an encoding unit for encoding the stored authentication information to generate an encoded authentication information;

a comparing unit for comparison of the encoded authentication information with the first authentication information; and a control unit for performing the steps of if the encoded authentication information corresponds to the first authentication information, storing the identification number in a storage area of the mobile terminal other than a one-time programmable OTP, and if the encoded authentication information does not correspond to the first authentication information, performing error handling;

providing the storage unit with a flash area formed of a flash memory device for storage of the authentication information and code received from an authentication data server and the identification number comprising at least one of an ESN or IMEI received from an identification number server and is replaceable when the encoded authentication information corresponds to the first authentication information in the OTP;

wherein the providing step further comprises the steps of configuring the storage unit to include the (OTP) area in which information stored once cannot be permanently changed and erased for storage of the first authentication information formed by encoding authentication information received from the authentication data server in the manufacture of the mobile terminal.

11. The mobile terminal of claim 10, wherein the identification number is a unique identification number allocated to each mobile terminal for differentiation.

* * * * *

UNITED STATES PATENT AND TRADEMARK OFFICE
CERTIFICATE OF CORRECTION

| | | |
|---|---|---|
| PATENT NO. | : 8,660,529 B2 | Page 1 of 1 |
| APPLICATION NO. | : 11/906932 | |
| DATED | : February 25, 2014 | |
| INVENTOR(S) | : Gun Woo Park et al. | |

It is certified that error appears in the above-identified patent and that said Letters Patent is hereby corrected as shown below:

In the Claims:

Column 8, Claim 1, Line 12 should read as follows:
--...information, storing a new...--

Signed and Sealed this
Sixth Day of May, 2014

Michelle K. Lee
*Deputy Director of the United States Patent and Trademark Office*